United States Patent [19]

Areauz et al.

[11] Patent Number: 4,702,768

[45] Date of Patent: Oct. 27, 1987

[54] PROCESS AND APPARATUS FOR INTRODUCING METAL CHIPS INTO A MOLTEN METAL BATH THEREOF

[75] Inventors: Larry D. Areauz, Portage; Robert H. Dudley, Richland, both of Mich.

[73] Assignee: Pre-Melt Systems, Inc., Kalamazoo, Mich.

[21] Appl. No.: 839,112

[22] Filed: Mar. 12, 1986

[51] Int. Cl.⁴ .......................... C22B 9/18; F27B 14/16
[52] U.S. Cl. .................................. 75/65 R; 75/68 R; 75/72; 266/88; 266/160; 266/200; 266/242; 266/900; 266/901
[58] Field of Search ............... 75/65 R, 68 R, 72, 256, 75/44 R, 44 S; 266/160, 200, 900, 901, 88

[56] References Cited

U.S. PATENT DOCUMENTS

| | | | |
|---|---|---|---|
| 2,234,127 | 3/1941 | Mautsch | 75/44 R |
| 3,202,408 | 8/1965 | Huhtala et al. | 75/65 R |
| 3,939,297 | 2/1976 | Aylard et al. | 75/65 R |
| 4,311,519 | 1/1982 | Berry | 75/65 R |

*Primary Examiner*—Melvyn J. Andrews
*Attorney, Agent, or Firm*—Gordon W. Hueschen

[57] ABSTRACT

A process for the introduction of metal chips, especially scrap metal chips, into a molten mass of the metal of which said chips are formed, wherein the essentially dry chips are first compacted and placed into strip form, and then introduced into the molten metal bath in such strip form in an essentially continuous manner, is disclosed. A cleaning flux is also advantageously incorporated with the chips, into the compacted and strip form thereof, and then into the bath. The metal chips, after compacting and placing into strip form, are introduced directly into the molten metal bath through the skin of metal oxide existing on its surface and caused to become a part of the metal pool beneath the surface thereof without essential disturbance of the metal oxide skin except at the point of introduction. The temperature in the molten metal pool at or near the point of introduction of the metal strip is sensed and communicated to means regulating the feed of the metal strip into the molten metal pool so as to coordinate the rate of introduction of the metal strip with the rate at which the added metal can conveniently and safely be melted and incorporated into the molten metal pool. Apparatus particularly suitable for carrying out the process of the invention is also disclosed.

27 Claims, 2 Drawing Figures

PROCESS AND APPARATUS FOR INTRODUCING METAL CHIPS INTO A MOLTEN METAL BATH THEREOF

BACKGROUND OF THE INVENTION

1. Field of Invention

Utilization of metal chips, especially scrap metal chips, particularly brass and aluminum. Introduction of said metal chips into a molten mass of metal of which they are formed. Employment of metal salt flux for cleaning or purifying the metal chips and/or the molten mass of metal into which introduced. Maintaining rate of chip introduction at an optimum level. Apparatus for so doing.

2. Prior Art

With the value of metal chips, especially brass and aluminum chips, constantly on the increase, and with scrap metal chips now valued at between twenty and fifty cents per pound, the recovery and utilization of metal chips, but especially scrap metal chips, has become more and more advantageous from an economic standpoint. It is now possible to dry metal chips, including even extremely dirty scrap metal chips, by the employment of chip wringers of various types, such as the type manufactured by Reclamet and sold under that trademark, but in any event it is possible to clean metal chips chemically in the presence of a detergent and then vaporize excess water or to burn off the oil from chips thermally in a controlled combustion apparatus such as the rotary drum type. This provides essentially dry metal chips, which "dryness" is essential in view of the fact that metal chips cannot be introduced into a molten metal bath in a moisture-containing state without highly undesirable and even explosive reactions involving dissociation of the water and spontaneous combustion of the evolved hydrogen gas. However, although the economic aspects of recovering and utilizing metal chips has constantly improved, making their recovery and reuse more desirable, technology has not kept pace with such economic facts. As presently utilized in practice, the metal chips, particularly of the nonferrous type, after separation from ferrous or other magnetic-type chips and cleaning and demoisturizing, are still introduced into the charge well of a reverberatory furnace, or even into a channel-type induction furnace or a coreless-type induction furnace, in a manner which approaches the archaic. As a matter of fact, in present day practice for the introduction of metal chips into the molten metal pool in the charge well of a reverberatory furnace, the chips are simply thrown or otherwise deposited upon the surface of the molten metal, with accompanying disturbance of the metal oxide skin which normally exists atop the bath of molten metal, and allowed to settle into the said molten metal in the charge well or like equiment. Whether this is done in a batch-wise or intermittent or continuous manner, the disturbance of the metal oxide skin atop the pool of molten metal is greatly disadvantageous and results in the agglomeration of much of the metal in the form of metal oxide as a part of said skin, rather than effectively causing the metal to melt in and become a part of the subterranean molten metal pool. In addition, when a metal salt flux of the usual type is employed for purposes of assisting with the cleaning of dirt and/or metal oxide from the molten metal, it is presently either sprinkled upon the chips or sprinkled upon the molten metal bath, at the top thereof, with very little efficiency due to the lack of intimate contact of the so-called "flux" with the metal chips being melted into the metal pool or with the relatively pure pool of molten metal itself. Further, no effective measures or apparatus are presently available for monitoring and controlling the rate of introduction of new metal into the pool at or near an optimum level. Nor has any suitable procedure or apparatus been developed for the alleviation of such inconvenient, time-consuming, and inefficient method of operation, whereby metal chips, and especially scrap metal chips, may be reintroduced into the stream of commerce in the form of new metal, which of course requires at the outset that they be introduced into and become a part of a molten metal pool which in turn can be employed for all of the usual purposes and in all of the usual forming equipment, such as extruders, dies, and the like, where metal chips themselves are of course of no utility whatever.

The method and apparatus of the present invention provide long-awaited improvements in both the process and the apparatus for the utilization of metal chips involving the necessary step of introducing the same into a molten bath thereof at the commencement of their reentry into the stream of commerce.

OBJECTS OF THE INVENTION

It is an object of the present invention to provide a new and improved process for the utilization of metal chips, especially scrap metal chips, involving introduction of the same into a molten bath of metal of which the said chips are formed, with an absolute minimization of metal losses during the melting process. Another object is the provision of apparatus admirably suited for employment in the said process. A further object is the provision of such a process wherein the metal chips are compacted and stripformed and then introduced into the molten metal bath in the form of a metal strip, batchwise, continuously, or intermittently. Another object of the invention is the provision of such a method wherein the rate of introduction of the said chips in metal strip form into the molten metal bath is correlated with the temperature level at or near the point of their introduction into the molten metal pool. Still another object of the invention is the provision of such a method wherein a metal salt flux, of the type generally employed for the cleansing of metal chips and/or metal pools into which they are introduced, is compacted and stripformed along with the metal chips and thereafter introduced into the molten metal bath in intimate contact with both the chips forming a part of the metal strip and with the bath into which introduced. An additional object of the invention is the provision of such a process for the industrial utilization of brass or aluminum or like chips involving introduction of said metal chips into a molten mass of metal of which said chips are formed, after compaction and stripforming of the same, preferably in admixture with a flux of the type previously mentioned. Still another object of the invention is the provision of such a method for the introduction of metal chips in the form of a metal strip directly into a pool of molten metal of which they are formed through a metal oxide skin on the surface of said pool and into immediate contact with the molten pool therebeneath, and causing said strip-formed metal to melt into and become a part of said metal pool without essential disturbance of the metal oxide skin except at the point of introduction of said strip-formed metal charged through the surface thereof.

Yet an additional object of the invention is the provision of apparatus which is uniquely and advantageously designed for use in carrying out the process of the invention. Other objects of the invention will become apparent hereinafter, and still other objects will be apparent to one skilled in the art to which this invention pertains.

SUMMARY OF THE INVENTION

The invention, then, inter alia, comprises the following:

A process for the industrial utilization of metal chips which involves the introduction of said metal chips into a mass of molten metal of which said chips are formed, comprising the steps of:

compacting and stripforming said metal chips into the form of a compacted metal strip, introducing the said metal chips, now in stripform metal form, at a point of introduction directly into said mass of molten metal, and causing said stripform metal to melt into and to become a part of said mass of molten metal without essential disturbance of the surface thereof except at the point of introduction of said stripform metal charge through the surface thereof; such a process wherein said metal chips are compacted and formed into a strip or rope; such a process wherein a metal salt flux, for purposes of removing foreign substances from said metal chips and on the stripform metal produced therefrom, as well as from the mass of molten metal itself, is compacted and stripformed along with said chips and wherein said flux is incorporated into the stripform metal charge along with said metal chips; such a process including the step of coordinating the rate of feed of said stripform metal into said mass of molten metal with the temperature in said mass of molten metal at or near the point of introduction of said stripform metal thereinto; such a process wherein the rate of introduction of said stripform metal into said mass of molten metal is reduced or stopped when said temperature in said molten metal mass at or near said point of introduction falls below a predetermined temperature; and a process for the industrial utilization of metal chips which involves the introduction of said metal chips into a molten mass of metal of which said chips are formed, comprising the following steps:

providing starting metal chips, compacting and stripforming said metal chips into the form of a stripform metal;

providing a pool of molten metal of which said starting chips are formed and having a metal oxide skin covering the surface thereof, providing a circulation flow pattern within said pool of molten metal without essentially disturbing the metal oxide skin, charging said stripform metal at a point of introduction directly into said mass of molten metal through said metal oxide skin covering the surface thereof and into immediate contact with the molten pool of metal therebeneath, causing said stripform metal to melt into and become a part of said molten metal pool without essential disturbance of the metal oxide skin except at the point of introduction of said stripform metal charge through the surface thereof, and causing said circulation flow pattern to circulate molten metal from said point of introduction to the hottest area of said pool of said molten metal and vice versa; such a process including the step of coordinating the rate of feed of said stripform metal into said mass of molten metal with the temperature in said mass of molten metal at or near the point of introduction of said stripform metal thereinto; such a process wherein the rate of introduction of said stripform metal into said mass of molten metal is reduced or stopped when said temperature in said molten metal mass at or near said point of introduction falls below a predetermined temperature; and such a process wherein a metal salt flux, for purposes of removing foreign substances on said metal chips and on the stripform metal produced therefrom, is compacted and stripformed along with said chips and wherein said flux is incorporated into the stripform metal charge along with said metal chips. Also, a process for the industrial utilization of brass, aluminum, or aluminum alloy chips which involves the introduction of said metal chips into a mass of molten metal of which said chips are formed, comprising the steps of:

compacting and stripforming said metal chips into the form of a compacted metal strip and introducing the said metal chips, now in stripform metal form, directly into said mass of molten metal through a metal oxide skin on the surface thereof and into immediate contact with a molten pool of metal therebeneath, and causing said stripform metal to melt into and to become a part of said metal pool without essential disturbance of the metal oxide skin except at the point of introduction of said stripform metal charge through the surface thereof; such a process wherein a metal salt flux, for purposes of removing foreign substances on said metal chips and on the stripform metal produced therefrom, is compacted and strip-formed along with said chips and wherein said flux is incorporated into the stripform metal charge along with said metal chips; such a process including the step of coordinating the rate of feed of said stripform metal into said mass of molten metal with the temperature in said mass of molten metal at or near the point of introduction of said stripform metal thereinto; and such a process wherein the rate of introduction of said stripform metal into said mass of molten metal is reduced or stopped when said temperature in said molten metal mass at or near said point of introduction falls below a predetermined temperature. Moreover, a process for the industrial utilization of metal chips which involves the introduction of said metal chips into a mass of molten metal of which said chips are formed, comprising the following steps:

providing a reverberatory furnace including a main chamber containing a pool of molten metal corresponding to the metal of which said chips are formed, maintaining a surface skin on said molten metal pool in the form of an oxide of the metal involved, providing a charge well for said reverberatory furnace and a molten pool of metal in said charge well and a metal oxide skin at the surface thereof, said molten metal pool and said metal oxide skin being in communication with the molten metal pool and said metal oxide skin in the said main chamber of said reverberatory furnace, providing a circulation flow pattern within said molten metal pool of said main chamber and extending into said molten metal pool within said charge well without essentially disturbing the metal oxide skin atop the molten metal pool in either said charge well or said main chamber to circulate molten metal from the hottest area of said pool of molten metal in said main chamber of said reverberatory furnace to a point of introduction of new metal into the charge well of said reverberatory furnace, continuously providing essentially dry starting metal chips, continuously compacting and strip-forming said metal chips into a stripform metal and introducing said stripform metal directly into said charge well through the metal oxide skin on the surface thereof and into immediate contact with the molten metal pool therebeneath, causing said stripform metal to melt into and become a part of said metal pool without essential disturbance of the continuous metal oxide skin atop said pool except at the point of introduction of said stripform metal charge through the surface thereof in said charge well, circulating said molten metal from said pool in said charge well from adjacent the point of introduction of new metal into said charge well to the hottest point of said molten metal in said main chamber of said reverberatory furnace and vice versa, and sensing the temperature in said pool in said charge well adjacent said point of introduction and controlling the rate of introduction of said stripform metal into said charge well in such a manner that the rate of feed is diminished or stopped when said temperature in said charge well drops below a predetermined minimum value; such a process wherein a metal salt flux, for purposes of removing foreign substances on said metal chips and on the stripform metal produced therefrom, is compacted and stripformed along with said chips and wherein said flux is thereby incorporated into the stripform metal charge into said molten metal pool along with said metal chips; and such a process wherein said chips are brass, aluminum, or an aluminum alloy. Further, in apparatus for the introduction of metal chips into a mass of molten metal of which said chips are formed, the combination comprising metal chip input means associated with compacting stripformer means having an entrance for metal chips and an exit for compacted stripform metal produced from said chips therein, a melting furnace chamber including a mass of molten metal therein corresponding to the metal of which said chips are formed, stripform introduction means for the introduction of stripform metal from said compacting stripformer exit directly into the mass of molten metal in said melting furnace chamber; such a combination comprising also a support frame supporting said metal chip input means and said metal compacting stripformer means together as a unit; such a combination comprising also metal chip storage means and metal chip feeding means associated with said metal chip input means; such a combination comprising also a support frame for supporting said metal chip storage means, metal chip feeding means, metal chip input means, and said metal compacting stripformer means together as a unit; such a combination wherein said support means is moveable; such a combination wherein said support means is moveable on wheels or rollers; and such a combination wherein said stripform metal introduction means is attached to said compacting stripformer and is also supported by said frame. Additionally, such a combination comprising also sensing means for sensing the temperature in said mass of molten metal and control means for coordinating the rate of exit of said stripform metal from said compacting stripformer means with the temperature sensed in said molten metal mass; and such a combination wherein said sensing means comprises a thermocouple and said control means comprises potentiometer, switch, or rheostat means.

THE DRAWINGS

Reference is now made to the drawings, wherein.

DETAILED DESCRIPTION OF THE INVENTION

Figure 1:
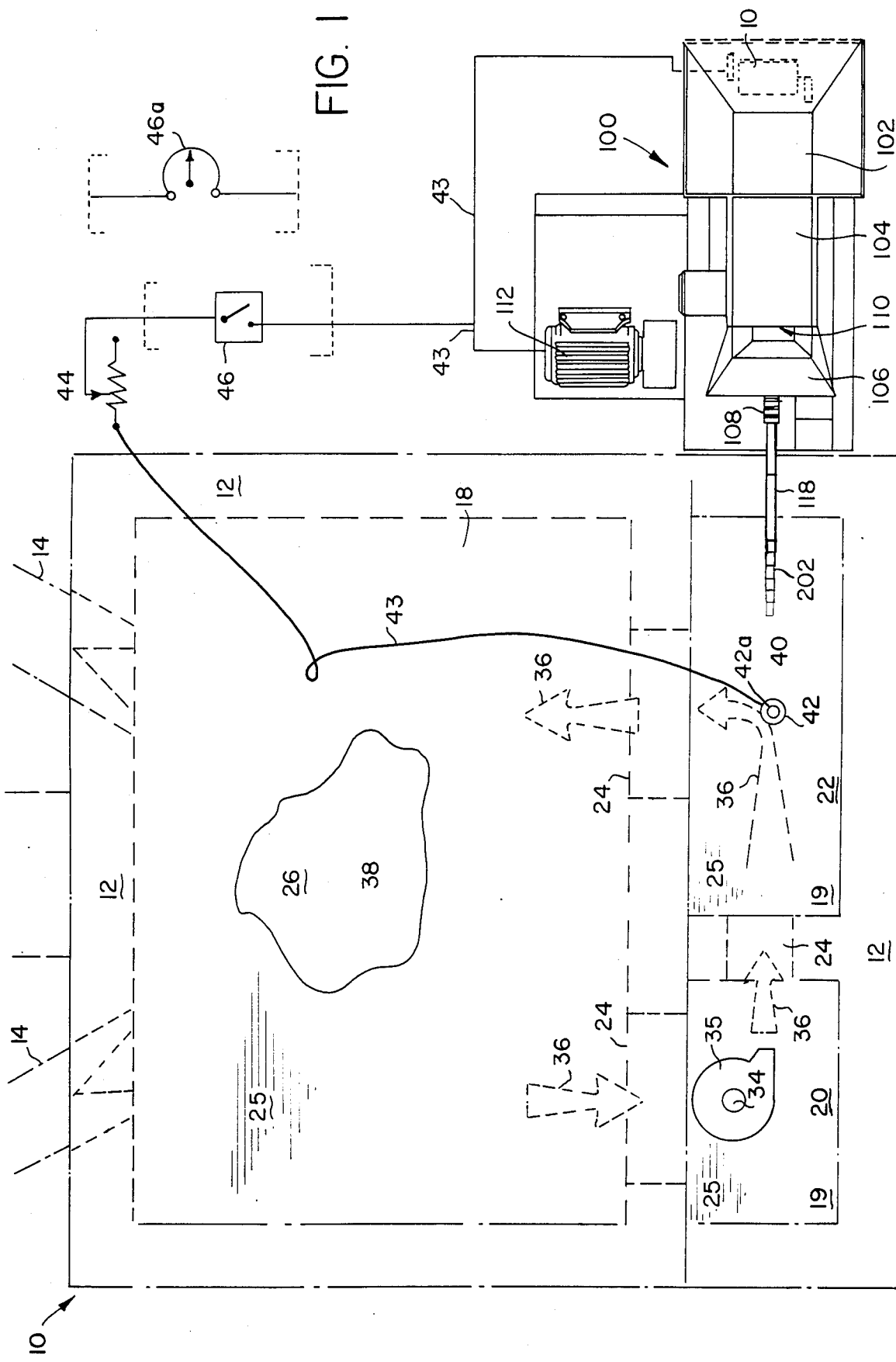
FIG. 1 is a top plan view of apparatus according to the invention and illustrating the method of the invention in association with a reverberatory furnace having a main chamber, a circulation well, and a charge well, all in communication, the reverberatory furnace and its associated chambers and wells being shown partially schematically and partially in section for simplicity and convenience.

The present invention, in both its method and apparatus aspects, will be more readily understood from the following detailed description, particularly when taken in conjunction with the drawings, in which all of the significant parts are numbered and wherein the same numbers are used to identify the same parts throughout.

A reverberatory furnace, having the usual refractory lining 12 and fired by combustion burners 14 fed by natural gas or fuel oil which throw flames into the interior of main chamber 18 thereof through flame-introduction means 16, is shown at 10, the base portions thereof being supported on floor 9 by means of I-beam supports 111. Main chamber 18 is provided with main chamber extensions 19 in the form of circulation well 20 and charge well 22, connected with each other and with main chamber 18 by means of communicating passageways 24. Molten metal 26, e.g., aluminum, magnesium, titanium, brass, or other alloys, is contained in main chamber 18 and is circulated from the hottest part thereof, indicated at 38, through circulation well 20 and charge well 22 via communicating passageways 24 by means of circulation means 27 including circulation pump 28 employed to create flow pattern 36, thereby to bring molten metal 26 from the hottest portion 38 of said main chamber 18 to the coldest portion of said continuous molten metal pool in charge well 22, indicated by the number 40, which is at or near the point at which fresh or used unmelted metal to be melted is introduced into charge well 22, as will be further explained hereinafter.

Circulation means 27 comprises circulation pump 28 including electrically or otherwise-driven motor 30 supported on support frame 32 above circulation chamber or well 20 and driving shaft 34 and associated heat-resistant (e.g., carbide or graphite) impeller, rotor, fan, or blade 35 located in circulation well 20. According to flow pattern 36 as created by circulation means 27, molten metal 26 in the furnace main chamber 18 constantly and continuously moves from the hottest point 38 in main chamber 18, through communicating passageways 24 into circulation well 20 and thence into charge well 22 to the coldest point 40 adjacent the point of introduction of a charge of new or used unmelted metal into charge well 22 via stripform metal introduction means 118 and cooperating stripform metal holddown guide 118a.

Shown disposed in charge well 22 relatively centrally thereof but adjacent coldest point 40 is sensor in the form of thermocouple 42, such as Honeywell Dialatrol TM or Electronic 15 TM or Barber-Coleman equivalent Model 560 TM, extending into or into close proximity with the molten metal pool 26 in charge well 22, said thermocouple being encapsulated in liquid-tight graphite protective tube 42a and being connected with potentiometer 44 and switch or rheostat 46 or 46a, for discontinuing feed into charge well 22 or varying the rate of said feed with temperature sensed in said molten metal pool 26 in charge well 22, by associated wiring 43, all such items 42, 42a, 43, 44, 46, and 46a being illustrated schematically in the drawings. Thus, as the temperature of the molten metal pool 26 in charge well 22 drops below a certain predetermined level, the rate of feed of new or used unmelted metal into charge well 22 may be reduced until the temperature again reaches a favorable predetermined higher level or may be completely discontinued until the temperature of the molten metal 26 in charge well 22 is at a suitable level to accommodate further feed thereof into charge well 22. Switch or rheostat 46 or 46a may be connected to one or more motors upon which feed of additional new or used unmelted metal into charge well 22 depends, as will be further explained hereinafter and, as seen in FIG. 1, switch or rheostat 46 or 46a is connected to compactor/stripformer means electric motor 112 and vibratory motor 105, which are respectively responsible for imparting compacting and stripforming capacity to briquetter or extruder means 110 and vibratory activity to vibratory trough feeder 104.

Figure 2:
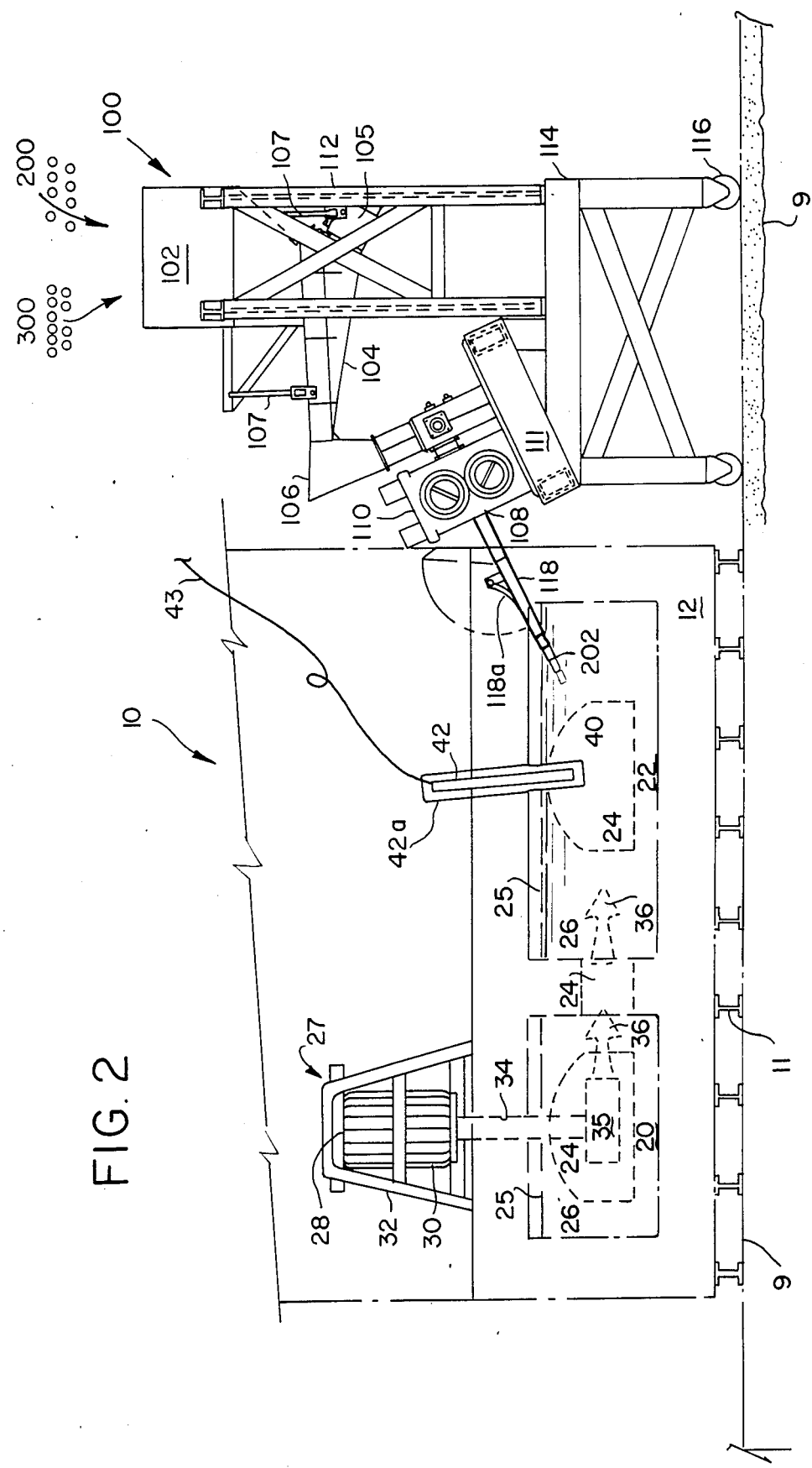
FIG. 2 is a side elevational view of apparatus according to the invention employed in carrying out the method of the invention in association with a reverberatory furnace including main chamber, circulation well, and charge well, the reverberatory furnace again being shown partially schematically and partially in section for purposes of convenience and simplicity.

As seen in FIG. 1, chip inlet and storage hopper 102 is connected to vibratory trough feeder 104 which, in turn, is connected to compacting briquetter or extruder means inlet 106. Materials entering chip compactor and strip-forming unit 100, shown as metal chips 200 in FIG. 2, enter metal chip inlet and storage hopper 102 and thence proceed via vibratory trough feeder 104, suspended by hangers 107 and activated by vibratory motor 105, into compacting briquetter or extruder means inlet 106. The compacting briquetter or extruder means 110 is mounted on angled base 111, actuated via electric motor 112, and is provided with metal strip exit 108 associated with stripform metal introduction means 118 and 118a from which the metal chips 200, now transformed, compacted, and converted into stripform metal 202, emerge via compacting briquetter or extruder means exit 108 and stripform metal introduction means 118 and 118a into the molten metal pool 26 in charge well 22. The metal chip inlet and storage hopper 102, vibratory trough feeder 104 and associated vibratory motor 105, as well as compacting briquetter or extruder means inlet 106 are all supported on upper frame 112, in turn supported by lower frame 114, which also supports angled base 111 upon which compacting briquetter or extruder means 110 is securely mounted. Lower frame 116 is shown provided with rollers or wheels 116 for movement out of and into close juxtaposition with charge well 22, preferably together with associated stripform metal introduction means 118 and 118a as shown attached to compacting briquetter or extruder means 110 at exit 108.

Thus, in operation according to the invention, dried metal chips, dried conventionally as is well known in the art as by cleaning chemically in the presence of detergent and then vaporizing water or by burning off of residual oil thermally in a controlled combustion apparatus such as a rotary drum type of combustion apparatus, preferably nonmagnetic chips such as brass or aluminum 200, are introduced into chip compactor and strip-forming unit 100 by introducing them into metal chip inlet and storage hopper 102. From hopper 102 they proceed via vibratory trough feeder 104 upon actuation of vibratory motor 105 into compacting briquetter or extruder means inlet 106, from whence they travel into the compacting briquetter or extruder means proper 110 for compacting into stripform metal 202, which then emerges via briquetter or extruder means exit 108 and is conducted via stripform metal introduction means 118 and cooperating stripform metal holddown guide 118a directly into the pool of molten metal 26 within charge well 22 through the metal oxide skin 25 on the surface thereof and into immediate contact with the molten metal pool 26 therebeneath without any essential disturbance of the metal oxide skin 25 except at the point of introduction of said stripform metal 202 charge through the surface thereof approximately at area 40 in charge well 22. The flow pattern 36 created by circulation means 27 including circulation pump 28 and associated rotor or blade 35 causes the molten metal 26 from the hottest area 38 of said pool of said molten metal 26 in said main chamber 18 to move to the point of introduction of stripform metal charge 202 into the molten metal 26 in charge well 22 at the point of introduction 40, which is approximately the coolest portion of said entire molten metal pool 26. As seen from the drawing, the flow pattern 36 then conducts the newly-charged stripform metal 202, which is caused to melt into and become a part of the metal pool 26 without the essential disturbance of the metal oxide skin 25 except at the point of introduction 40 of said stripform metal 202 charge through the metal oxide surface 25 of said molten metal pool 26, via communicating passageway or port 24 into main chamber 18 and into the hottest portion 38 of the molten metal pool 26 therein, the procedure being continuously repeated as the chips 200 are continuously fed into the chip compactor and strip-forming unit 100 and emerge therefrom as stripform metal 202 via exit 108 and introduction means 118 and 118a over an extended period such as, ordinarily, 16 to 24 hours without stopping unless, for some reason, the temperature at or near the point of introduction 40 should drop below a predetermined necessary or convenient temperature level for continued or continuous operation, as previously mentioned, representatively below 2000 degrees F. for brass or other copper-containing alloys and 1250 degrees F. for aluminum and aluminum-containing alloys.

In such case thermocouple or sensor 42 maintained in molten metal pool 26 in charge well 22, or in close proximity thereto, communicates the temperature drop via potentiometer 44 to switch 46, or to rheostat 46a, for cutting off the power to the compactor stripforming unit and/or to the briquetter/extruder means or vibratory feed unit, or for reducing the power to any or all of them to a predetermined lower level, until the temperature in the molten metal pool 26 at approximately the point of introduction 40 of additional metal to be melted in the form of stripform metal 202 again reaches a predetermined level, whereupon the circuitry reverses itself and the compacting briquetter/extruder means and vibratory feed trough are permitted to operate once more at a normal or predetermined higher rate. In any event, the rate of feed of stripform metal 202 into molten metal pool 26 at point of introduction 40 is related to the establishment and maintenance of a satisfactorily high temperature level at that point so that the molten metal pool 26 in charge well 22 does not "freeze up" or become undesirably solidified due to inadequate temperature and/or inadequate circulation from point of introduction, and usually the point of lowest temperature, 40, into main chamber 18 and to the area 38 of greatest heat in the molten metal pool 26 contained therein.

An important innovation according to the present invention is the employment of "flux" in a unique and advantageous manner. Whereas "flux", which is ordinarily a salt employed for purposes of cleansing metal chips and the molten metal in the bath of foreign substances, including dirt and metal oxides and the like, is ordinarily simply thrown or otherwise deposited on the metal oxide skin 25 on top of the molten metal pool 26 in a charge well 22 or in a main chamber 18, according to the present invention this flux 300 is introduced into the chip compactor and strip-forming unit 100 along with the metal chips 200 and is incorporated into the stripform metal 202 which emerges from the compacting briquetter/extruder means and enters directly into charge well 22 as an integral part of said stripform metal 202. Since the said flux is introduced into the compacting briquetter/extruder means along with the metal chips and becomes an integral part of the stripform metal as it emerges from the briquetter/extruder means and enters the molten metal pool 26 through metal oxide skin 25, it is at all times in intimate contact with the chips themselves and with the stripform metal formed from said chips, as well as the molten metal beneath the surface of the molten metal pool 26 itself, and provides a manner of dealing with the cleansing of chips and metal of foreign substances including metal oxides, dirt, and the like which is far superior to any method of employing flux heretofore proposed.

According to the skill of the art, it is understood that 100 pounds of metal chips are capable of conversion into approximately 90 pounds of molten metal, so that the loss is approximately 10 pounds, and that approximately ½ to 1½ pounds of flux is required for each 10 pounds of loss, so that about 5 to 15 pounds of flux would be required for combination with 100 pounds of starting metal chips. According to the skill of the art, also, such salt flux may advantageously comprise approximately 48% by weight of sodium chloride, 48% of potassium chloride, and approximately 4% of sodium aluminum fluoride, although it is entirely possible to vary the flux widely according to the state and knowledge of the art depending upon the state of cleanliness of the starting chips being employed, the exact type of metal and metal chips involved, and numerous other considerations which are well known to one skilled in the art.

With or without the employment of a flux, the process of the present invention produces remarkable results from the standpoint of minimizing metal loss during the melting process due to rapid heat transfer from the molten bath to the stripform metal into which the chips are converted, in the essential absence of free oxygen below the surface of the metal bath while maintaining the protective metal oxide skin essentially intact, in such processes where the same is present, as well as the underlying molten metal pool, since it is not necessary to disturb either of the same mechanically to attain the desired melting effect when operating according to the procedure of the present invention.

The method and apparatus of the invention, as disclosed in detail herein, are of greatest advantage in the introduction of metal chips into the charge well of a reverberatory furnace, with an absolute minimization of metal losses during the melting process, but they are of course utilizable for the introduction of metal chips in stripform metal form into any kind of a molten metal pool of the type involved in a reverberatory furnace with its associated chamber extensions such as circulation well and charge well with the same advantage. The advantages of the apparatus and method of the present invention are also realized, although perhaps to a somewhat more limited extent, in the introduction of metal chips into a metal pool maintained in a refractory-lined steel-cased cylindrical vessel of the type employed in an induction furnace, which produces a so-called quiet bath in a channel-type of operation. Moreover, the apparatus and method of the invention can advantageously be employed even in the introduction of metal chips into a molten metal pool maintained in an induction furnace of the coreless type, although not with the same great advantage as described and realized for a reverberatory furnace, inasmuch as such an induction furnace produces a molten metal bath having orbital movement components so that the problem of disturbance of the metal oxide surface skin is not such a critical factor in the introduction of new metal into an induction furnace type melting operation, as again will be fully understood by one skilled in the art, although disturbance of the surface of the molten metal pool is maintained at an absolute minimum also in such case.

IN GENERAL

The process and apparatus of the present invention is particularly adapted for use in connection with nonmagnetic metal scraps such as brass, aluminum, aluminum alloys, and the like, and such nonmagnetic metal scraps may conveniently be separated from a mass of metal scraps including also ferrous, ferric, or other magnetic chips by the employment of magnetic separation means, as is now well known and established in the art.

The compactor-stripforming device according to the present invention may be any suitable device which compacts the metal chips into a more solid form and places them in the form of a strip. Such a device may conveniently be a compacting briquetter, particularly a briquetter such as produced by K.R. Komarek, and, among briquetters, their models B-220 and B-400 are preferred. Another means of compacting and stripforming is a compacting extruder, whereby the same result is obtained, although the stripform metal product may in such case have not only the form of an exact strip, being wider than it is thick, but also circular in cross section, square in cross section, or having another cross-sectional shape. With such cross sections, the extrusion is frequently referred to as "ropeform" but, in the context of the present invention, such cross-sectional extrusions are also included within the scope of "stripform", as it is the continuous strip which is of interest and not the precise or particular cross-sectional shape thereof. Especially suitable compacting extruders are available from Farrell Corporation and Mohr Industrial Corporation and the more sophisticated models are as usual preferred. Alternatively, less sophisticated helical-screw-compacting extruders of other types may be employed within the principles and context of the present invention, although not with the same high performance advantages. Still other types and models of compacting briquetters and extruders will be found adaptable to employment as a part of the apparatus of the present invention and in carrying out the method of the invention.

Whereas, in the foregoing, the wringing of chips has been referred to as standard procedure, representatively to be carried out in a Reclamet wringing centrifuge, Reclamet models of particular adaptability to the removal of moisture and/or oil from the surface of metal chips are found to be their models TD-3000, TD-4000, and TD-5000.

Although, in referring to the foregoing detailed description of the invention and to the drawings, reference is made to the employment of a thermocouple or sensor for sensing the temperature in or in close juxtaposition to the molten metal in the charge well of the reverberatory furnace, and connected through a potentiometer to an on-off switch or rheostat, for controlling the speed of introduction of compacted chips in the form of stripform metal into the charge well, it should be clear that any equivalent electrical and/or mechanical arrangement may be employed whereby, when the temperature sensed in the charge well, or otherwise at or near the point of introduction of fresh metal (either used or new, but in any event to be melted) into a molten metal bath, reaches a level which is considered sufficiently low to represent a potential danger in the form of excessive crystallization or solidification (due to a temperature drop to below that required for rapid melting of new metal in the vicinity of the new metal introduction), the rate of introduction of new metal into the molten metal bath is diminished until the temperature can rebound to a safe level, whether this be by reducing the rate of operation of the compactor-stripformer and/or the feed into the same or by completely switching off one or the other or both of such means until an adequate temperature is again sensed in or near the point of new metal introduction into the molten metal bath so that the previously-existing potential problem is no longer of concern.

Whereas, in this Specification and claims, reference is frequently made to "metal chips", this is to be understood as encompassing metal chips of various almost unlimited proportions, configurations, and dimensions, but particularly to include small pieces and/or particles, likewise of extremely variable dimensions, and in general the term "metal chips" is employed herein as having the usual meaning to one skilled in the art, being inclusive not only of parts, pieces, particles, fragments, of the usual type from scrap, but also previously unused metal in standard or odd configurations remaining from previous molding, extruding, casting, rolling, or like metal processing operations, and it goes without saying that inconveniently large pieces can be reduced in size in any convenient manner and employed as metal chips and that, accordingly, any suitable metal, whether scrap or otherwise, can be converted into chips and employed in the process and apparatus of the invention, whether new metal or previously used metal, including even and especially new and used aluminum sheet and can scrap, when it is determined that such further processing into new metal is required or desired by the operator.

It is thereby seen from the foregoing that the objects of the present invention have been accomplished and that a novel, efficient, and economic process for the introduction of metal chips into a molten mass of the metal of which said chips are formed, involving compacting and stripforming said metal chips and then introducing the strip-form metal into the molten metal bath, all in accord with the foregoing, has been provided thereby, as well as apparatus for use in carrying out the said process, and whereby all of the previously-mentioned advantages have been attained and the shortcomings of the prior art have been obviated.

Although the preferred embodiments of the invention have been illustrated in the accompanying drawings and described in the foregoing description, it is to be understood that the invention is not limited to the embodiments disclosed or to the exact details of operation or exact compounds, compositions, methods, or procedures shown and described, since the invention is capable of numerous modifications, rearrangements, and substitutions of parts and elements and other equivalents, whether metallurgical, chemical, or mechanical, without departing from the spirit or scope of the invention, as will readily be apparent to one skilled in the art, wherefore the present invention is to be understood as limited only by the full scope which can be legally accorded the appended claims.

We claim:

1. A process for the industrial utilization of metal chips which involves the introduction of said metal chips into a mass of molten metal of which said chips are formed, comprising the steps of:

compacting and stripforming said metal chips into the form of a compacted metal strip, introducing the said metal chips, now in stripform metal form, at a point of introduction directly into said mass of molten metal, and causing said stripform metal to melt into and to become a part of said mass of molten metal below the surface thereof without essential disturbance of the surface thereof except at the point of introduction of said stripform metal charge through the surface thereof.

2. A process of claim 1, wherein said metal chips are compacted and formed into a strip or rope.

3. A process of claim 1, wherein a metal salt flux, for purposes of removing foreign substances on said metal chips and on the stripform metal produced therefrom, is compacted and stripformed along with said chips and wherein said flux is incorporated into the stripform metal charge along with said metal chips.

4. A process of claim 1 including the step of coordinating the rate of feed of said stripform metal into said mass of molten metal with the temperature in said mass of molten metal at or near the point of introduction of said stripform metal thereinto.

5. A process of claim 4, wherein the rate of introduction of said stripform metal into said mass of molten metal is reduced or stopped when said temperature in said molten metal mass at or near said point of introduction falls below a predetermined temperature.

6. A process of claim 3 including the step of coordinating the rate of feed of said stripform metal into said mass of molten metal with the temperature in said mass of molten metal at or near the point of introduction of said stripform metal thereinto.

7. A process of claim 6, wherein the rate of introduction of said stripform metal into said mass of molten metal is reduced or stopped when said temperature in said molten metal mass at or near said point of introduction falls below a predetermined temperature.

8. A process for the industrial utilization of metal chips which involves the introduction of said metal chips into a molten mass of metal of which said chips are formed, comprising the following steps:

providing starting metal chips, compacting and stripforming said metal chips into the form of a stripform metal, providing a pool of molten metal of which said starting chips are formed and having a metal oxide skin covering the surface thereof, providing a circulation flow pattern within said pool of molten metal without essentially disturbing the metal oxide skin, charging said stripform metal at a point of introduction directly into said mass of molten metal through said metal oxide skin covering the surface thereof and into immediate contact with the molten pool of metal therebeneath, causing said stripform metal to melt into and become a part of said molten metal pool without essential disturbance of the metal oxide skin except at the point of introduction of said stripform metal charge through the surface thereof, and causing said circulation flow pattern to circulate molten metal from said point of introduction to the hottest area of said pool of said molten metal and vice versa.

9. A process of claim 8 including the step of coordinating the rate of feed of said stripform metal into said mass of molten metal with the temperature in said mass of molten metal at or near the point of introduction of said stripform metal thereinto.

10. A process of claim 9, wherein the rate of introduction of said stripform metal into said mass of molten metal is reduced or stoppped when said temperature in said molten metal mass at or near said point of introduction falls below a predetermined temperature.

11. A process of claim 10, wherein a metal salt flux, for purposes of removing foreign substances on said metal chips and on the stripform metal produced therefrom, is compacted and stripformed along with said chips and wherein said flux is incorporated into the stripform metal charge along with said metal chips.

12. A process for the industrial utilization of brass, aluminum, or aluminum alloy chips which involves the introduction of said metal chips into a mass of molten metal of which said chips are formed, comprising the steps of:

compacting and stripforming said metal chips into the form of a compacted metal strip and introducing the said metal chips, now in stripform metal form, directly into said mass of molten metal through a metal oxide skin on the surface thereof and into immediate contact with a molten pool of metal therebeneath, and causing said stripform metal to melt into and to become a part of said metal pool without essential disturbance of the metal oxide skin except at the point of introduction of said stripform metal charge through the surface thereof.

13. A process of claim 12, wherein a metal salt flux, for purposes of removing foreign substances on said metal chips and on the stripform metal produced therefrom, is compacted and stripformed along with said chips and wherein said flux is incorporated into the stripform metal charge along with said metal chips.

14. A process of claim 12 including the step of coordinating the rate of feed of said stripform metal into said mass of molten metal with the temperature in said mass of molten metal at or near the point of introduction of said stripform metal thereinto.

15. A process of claim 14, wherein the rate of introduction of said stripform metal into said mass of molten metal is reduced or stopped when said temperature in said molten metal mass at or near said point of introduction falls below a predetermined temperature.

16. A process for the industrial utilization of metal chips which involves the introduction of said metal chips into a mass of molten metal of which said chips are formed, comprising the following steps:

providing a reverberatory furnace including a main chamber containing a pool of molten metal corresponding to the metal of which said chips are formed, maintaining a surface skin on said molten metal pool in the form of an oxide of the metal involved, providing a charge well for said reverberatory furnace and a molten pool of metal in said charge well and a metal oxide skin at the surface thereof, said molten metal pool and said metal oxide skin being in communication with the molten metal pool and said metal oxide skin in the said main chamber of said reverberatory furnace, providing a circulation flow pattern within said molten metal pool of said main chamber and extending into said molten metal pool within said charge well without essentially disturbing the metal oxide skin atop the molten metal pool in either said charge well or said main chamber to circulate molten metal from the hottest area of said pool of molten metal in said main chamber of said reverberatory furnace to a point of introduction of new metal into the charge well of said reverberatory furnace, continuously providing essentially dry starting metal chips, continuously compacting and strip-forming said metal chips into a stripform metal and introducing said stripform metal directly into said charge well through the metal oxide skin on the surface thereof and into immediate contact with the molten metal pool therebeneath, causing said stripform metal to melt into and become a part of said metal pool without essential disturbance of the continuous metal oxide skin atop said pool except at the point of introduction of said stripform metal charge through the surface thereof in said charge well, circulating said molten metal from said pool in said charge well from adjacent the point of introduction of new metal into said charge well to the hottest point of said molten metal in said main chamber of said reverberatory furnace and vice versa, and sensing the temperature in said pool in said charge well adjacent said point of introduction and controlling the rate of introduction of said stripform metal into said charge well in such a manner that the rate of feed is diminished or stopped when said temperature in said charge well drops below a predetermined minimum value.

17. A process of claim 16, wherein a metal salt flux, for purposes of removing foreign substances on said metal chips and on the stripform metal produced therefrom, is compacted and stripformed along with said chips and wherein said flux is thereby incorporated into the stripform metal charge into said molten metal pool along with said metal chips.

18. A process of claim 17, wherein said chips are brass, aluminum, or an aluminum alloy.

19. In apparatus for the introduction of metal chips into a mass of molten metal of which said chips are formed, the combination comprising metal chip input means associated with compacting stripformer means having an entrance for metal chips and an exit for compacted stripform metal produced from said chips therein, a melting furnace chamber for containing a mass of molten metal therein corresponding to the metal of which said chips are formed, stripform introduction means for the introduction of stripform metal from said compacting stripformer exit directly into a mass of molten metal when contained in said melting furnace chamber without essential disturbance of the surface thereof except at the point of introduction of said stripform metal charge through the surface thereof.

20. The combination of claim 19, comprising also a support frame supporting said metal chip input means and said metal compacting stripformer means together as a unit.

21. The combination of claim 19, comprising also metal chip storage means and metal chip feeding means associated with said metal chip input means.

22. The combination of claim 21, comprising also a support frame for supporting said metal chip storage means, metal chip feeding means, metal chip input means, and said metal compacting stripformer means together as a unit.

23. The combination of claim 20, wherein said support means is moveable.

24. The combination of claim 23, wherein said support means is moveable on wheels or rollers.

25. The combination of claim 20, wherein said stripform metal introduction means is attached to said compacting stripformer and is also supported by said frame.

26. The combination of claim 19, comprising also sensing means for sensing the temperature in a mass of molten metal when contained in said chamber and control means for coordinating the rate of exit of said stripform metal from said compacting stripformer means with the temperature sensed in said molten metal mass.

27. The combination of claim 26, wherein said sensing means comprises a thermocouple and said control means comprises potentiometer, switch, or rheostat means.

* * * * *

UNITED STATES PATENT AND TRADEMARK OFFICE
CERTIFICATE OF CORRECTION

PATENT NO. : 4,702,768
DATED : October 27, 1987
INVENTOR(S) : Larry D. Areaux and Robert H. Dudley It is certified that error appears in the above-identified patent and that said Letters Patent is hereby corrected as shown below:

Title Page, line 2; "Areauz et al." should read -- Areaux et al. --

Title Page, [75] Inventors:; "Larry D. Areauz" should read -- Larry D. Areaux --

Signed and Sealed this

Fifteenth Day of March, 1988

Attest:

DONALD J. QUIGG

Attesting Officer

Commissioner of Patents and Trademarks